United States Patent
Hasama

(10) Patent No.: US 11,843,734 B2
(45) Date of Patent: Dec. 12, 2023

(54) INFORMATION PROCESSING APPARATUS AND INFORMATION PROCESSING METHOD

(71) Applicant: CANON KABUSHIKI KAISHA, Tokyo (JP)

(72) Inventor: Yuichi Hasama, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/507,559

(22) Filed: Oct. 21, 2021

(65) Prior Publication Data

US 2022/0131981 A1 Apr. 28, 2022

(30) Foreign Application Priority Data

Oct. 27, 2020 (JP) .................................. 2020-179602

(51) Int. Cl.
*H04N 1/00* (2006.01)
*G06K 15/02* (2006.01)

(52) U.S. Cl.
CPC ....... *H04N 1/0044* (2013.01); *G06K 15/1807* (2013.01); *H04N 1/00427* (2013.01); *H04N 1/00482* (2013.01)

(58) Field of Classification Search
CPC ............ H04N 1/0044; H04N 1/00427; H04N 1/00482; G06K 15/1807
See application file for complete search history.

(56) References Cited

U.S. PATENT DOCUMENTS

| | | | | |
|---|---|---|---|---|
| 5,129,639 A | * | 7/1992 | DeHority | G06F 3/1204 399/370 |
| 2008/0024804 A1 | * | 1/2008 | Yamanaka | H04N 1/6011 358/1.9 |
| 2009/0086244 A1 | * | 4/2009 | Matoba | H04N 1/32133 358/1.13 |
| 2019/0138251 A1 | * | 5/2019 | Konishi | G06F 3/1204 |

FOREIGN PATENT DOCUMENTS

JP 2005236954 A 9/2005

* cited by examiner

*Primary Examiner* — King Y Poon
*Assistant Examiner* — Michael L Burleson
(74) *Attorney, Agent, or Firm* — Canon U.S.A., Inc. IP Division

(57) ABSTRACT

An information processing apparatus includes one or more processors, and at least one computer-readable medium storing executable instructions, wherein the at least one computer-readable medium and the one or more processors are configured to: cause a first printing setting UI including a plurality of printing setting values corresponding to a plurality of printing setting items to be displayed on a display unit, and cause a second printing setting UI to be displayed on the display unit. The second printing setting UI includes an area for setting contrast, a sample image displayed with the set contrast, and an object for printing the sample image. In causing a printing unit to print the sample image in response to a selection of the object, part of the plurality of printing setting values set in the first printing setting UI are not used, and other remaining printing setting values are used.

18 Claims, 10 Drawing Sheets

INFORMATION PROCESSING APPARATUS AND INFORMATION PROCESSING METHOD

BACKGROUND

Field of the Disclosure

The present disclosure relates to an information processing apparatus, an information processing method, and a program.

Description of the Related Art

When printing is performed by an information processing apparatus such as a personal computer using a printer, software generally called a printer driver is used. The printer driver operates when an arbitrary application performs printing setting. Use of the printer driver makes it possible to specify various printing settings using a specific user interface provided by the printer driver.

Japanese Patent Laid-Open No. 2005-236954 discloses a sample printing function for calibration of copy-forgery-inhibited pattern printing. The sample printing function refers to a function for adjusting colors such that when colors desired by a user are displayed on a display, printing is performed to check whether the colors desired by the user are also achieved on the printed result, and color adjustment is performed according to the printed result.

However, in the method disclosed in Japanese Patent Laid-Open No. 2005-236954, parameters related to large dots and the small dots of the copy-forgery-inhibited pattern are printed when sample printing is performed, but other conditions are not printed on a result of the sample printing. Therefore, when the result of the sampling printing is checked after the sample printing is performed, it is difficult to grasp the conditions used in the sample printing, and the user has to perform an additional job to manage the conditions.

SUMMARY

According to some embodiments, the present disclosure provides an information processing apparatus including one or more processors, and at least one computer-readable medium storing executable instructions configured to be executed by the one or more processors, wherein the at least one computer-readable medium and the one or more processors are configured to: cause a first printing setting UI including a plurality of printing setting values corresponding to a plurality of printing setting items to be displayed on a display unit, and cause a second printing setting UI to be displayed on the display unit, the second printing setting UI including an area for setting contrast, a sample image displayed with the set contrast, and an object for printing the sample image, wherein in causing a printing unit to print the sample image in response to a selection of the object, part of the plurality of printing setting values set in the first printing setting UI are not used, and other remaining printing setting values are used.

Further features of the present disclosure will become apparent from the following description of exemplary embodiments with reference to the attached drawings.

DESCRIPTION OF THE EMBODIMENTS

Embodiments for carrying out the present disclosure are described with reference to the drawings.

Figure 1:
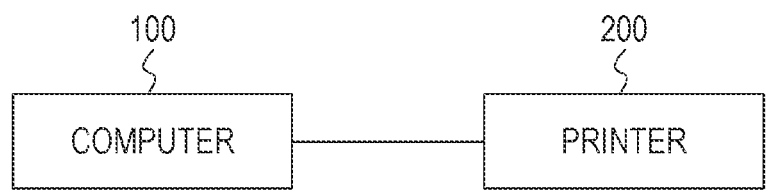
FIG. 1 is a diagram showing a system configuration.

FIG. 1 is a diagram showing an example of a configuration of a printing system according to an embodiment. As shown in FIG. 1, the printing system includes a computer 100 and a printer 200. The computer 100 and the printer 200 each have a communication function thereby being capable of communicating with each other via a network such as USB or LAN. The computer 100 is an example of an information processing apparatus. The printer 200 performs printing under the control of the computer 100. The printer 200 may be a printing apparatus having only a printing function, or may be a multifunction apparatus having a plurality of functions such as a printing function, a scanning function, a copying function, and/or the like. The printing system may include one or more computers 100 and one or more printers 200, and they may be connected with each other via a network. In the present embodiment, a main part that executes the processing of the present embodiment is the computer 100, which is a single information processing apparatus. However, a system including a plurality of apparatuses or a system in which a plurality of apparatuses are connected via a network or the like may execute the process according to the present embodiment.

Figure 2:
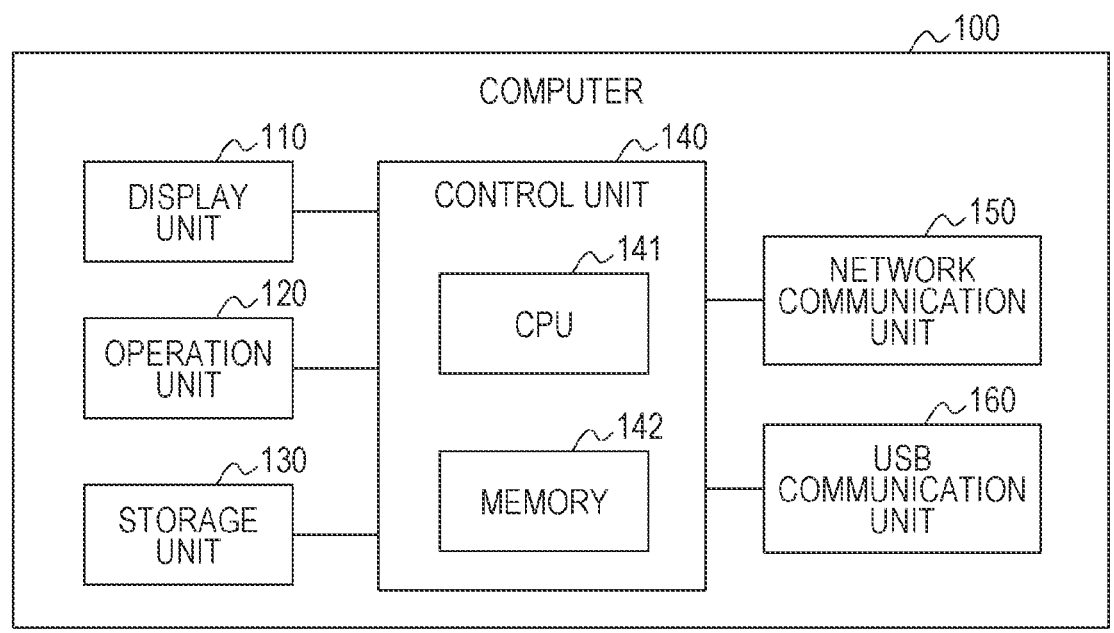
FIG. 2 is a diagram showing a hardware configuration of a computer.

FIG. 2 is a diagram showing an example of a hardware configuration of the computer 100 according to the present embodiment. The computer 100 includes a display unit 110, an operation unit 120, a storage unit 130, a control unit 140, a network communication unit 150, and a USB communication unit 160. The control unit 140 includes a CPU (Central Processing Unit) 141 and a memory 142, and controls the entire computer 100. Software of the computer 100 and steps of flowcharts which will be described later are realized by the CPU 141 by executing a process based on a program stored in the storage unit 130. The memory 142 is realized using a ROM, a RAM, or the like. The memory 142 functions as a main memory, a work area, or the like of the CPU 141. The memory 142 also stores data or the like used in processing.

The display unit 110 is an output apparatus such as a display. The display unit 110 displays a UI (user interface) under the control of the control unit 140. The operation unit 120 is an input apparatus such as a mouse, a keyboard, a touch panel or the like, and provides, to the control unit 140, various instructions given via operations performed by a user. The storage unit 130 is a storage medium such as an HD (Hard Disk) or SSD (Solid State Drive), and stores various programs and various data used in operating the computer 100. The network communication unit 150 inputs/outputs data from/to an external device connected via a network such as a LAN. The USB communication unit 160 inputs/outputs data from/to an external device connected via USB. The external device is, for example, the printer 200 shown in FIG. 1.

The function of the computer 100 according to the present embodiment is realized by loading a program stored in the storage unit 130 into the memory 142 and executing the program by the CPU 141.

Figure 3:
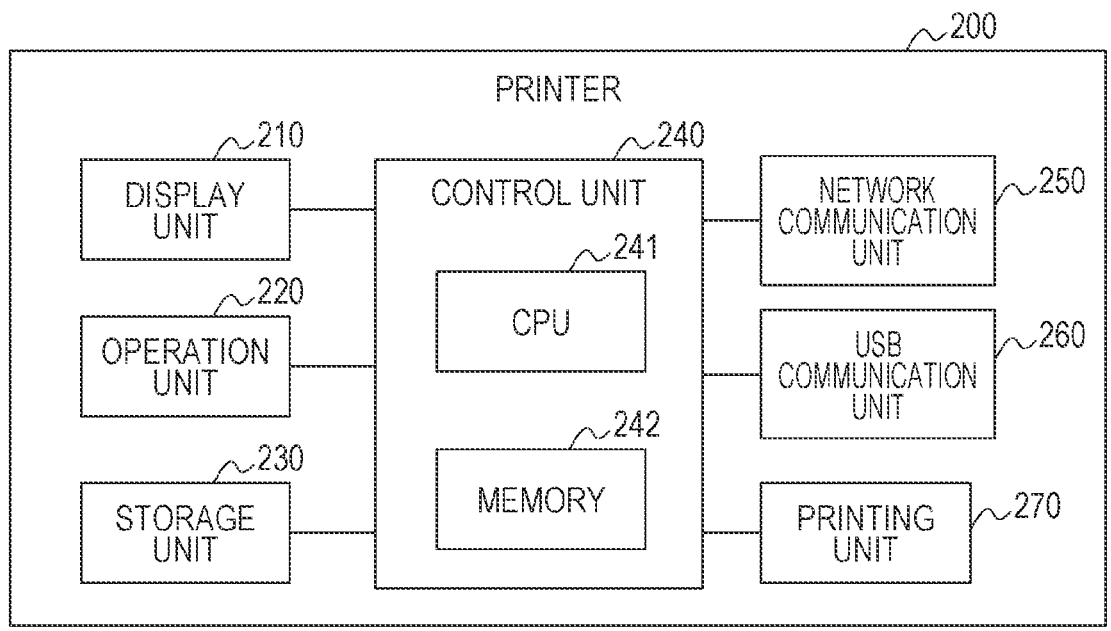
FIG. 3 is a diagram showing a hardware configuration of a printer.

FIG. 3 is a diagram showing an example of a hardware configuration of the printer 200 according to the present embodiment. The printer 200 includes a display unit 210, an operation unit 220, a storage unit 230, a control unit 240, a network communication unit 250, a USB communication unit 260, and a printing unit 270. The control unit 240 includes a CPU 241 and a memory 242, and controls the entire printer 200. A process performed by the printer 200 is realized by the CPU 241 by executing the process according to a program stored in the storage unit 230. The memory 242 includes a ROM, a RAM, or the like, and functions as a main memory, a work area, or the like of the CPU 241. The memory 242 also stores data or the like used in the process.

The display unit 210 is an output apparatus such as a liquid crystal panel, and displays information to a user under the control of the control unit 240. The operation unit 220 is an input apparatus such as a touch panel, a button or the like, and provides, to the control unit 240, various instructions given via operations performed by a user. The storage unit 230 is a storage medium such as an HD or SSD, and stores various programs used in operations by the printer 200. These various programs are loaded into the memory 242 as needed and executed by the CPU 241. The network communication unit 250 inputs/outputs data from/to an external device connected via a network such as a LAN. The USB communication unit 260 inputs/outputs data from/to an external device connected via USB. The external device is, for example, the computer 100 shower ire FIG. 1. The printing unit 270 prints digital data stored in the storage unit 230 or the memory 242 on physical paper under the control of the control unit 240. Printing may be performed by an ink method, a toner method, or other methods.

Figure 4:
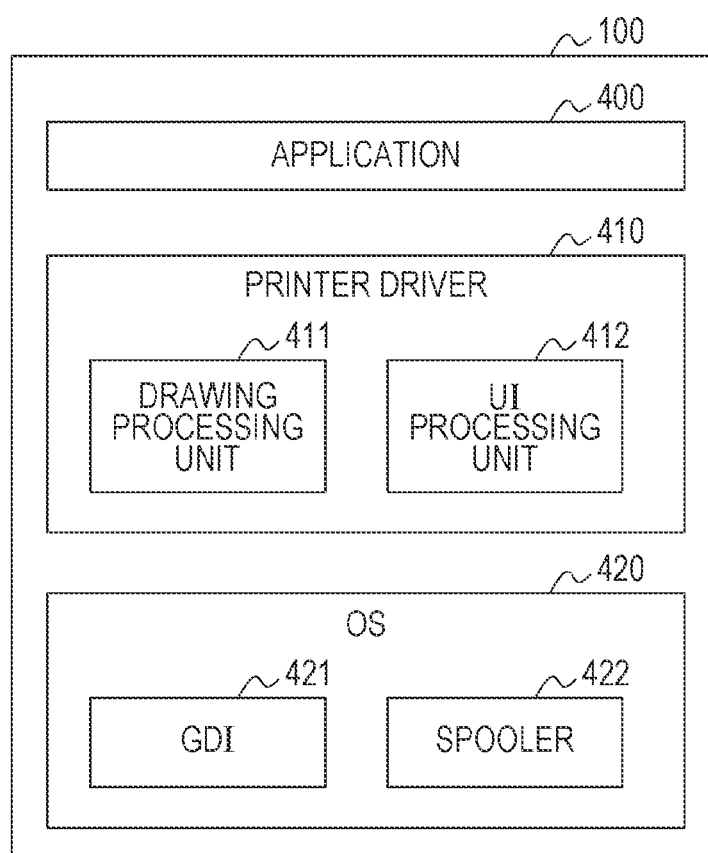
FIG. 4 is a diagram showing a software configuration of a computer.

FIG. 4 is a block diagram showing a part of the software related to a printing process performed by the computer 100 according to the present embodiment. The software of the computer 100 mainly includes an application 400, a printer driver 410, and an OS (Operating System) 420. The programs related to the application 400, the printer driver 410, and the OS 420 are stored in the storage unit 130, and they are loaded into the memory 142 and executed by the CPU 141. As a result, the functions of the application 400, the printer driver 410, and the OS 420 are realized.

The application 400 is arbitrary software, and may include one or more applications such as document generation software, spreadsheet software, and/or the like. Each application 400 has a printing function, which works such that when a printing instruction issued by a user is received, the printing function provides information or the like currently displayed on the display unit 110 to the printer driver 410 or the OS 420.

The printer driver 410 includes mainly a UI processing unit 412 and a drawing processing unit 411. The UI processing unit 412 displays, on the display unit 110, a UI for displaying setting items that are available on the printer 200 and allowing setting values of the setting items to be set or changed. The drawing processing unit 411 generates drawing data that can be interpreted by the printer 200 when printing thereof is performed. The drawing data is described, for example, in PDL (Page Description Language).

The OS 420 is software that controls basic operations of the computer 100, and manages the application 400 and the printer driver 410. The OS 420 has a GDI (Graphics Device Interface) 421 and a spooler 422, which are functions that mainly operate in printing. The GDI 421 provides an interface for displaying or printing to the application 400 and the printer driver 410. The spooler 422 performs a process of transmitting drawing data to the printer 200.

Figure 5:
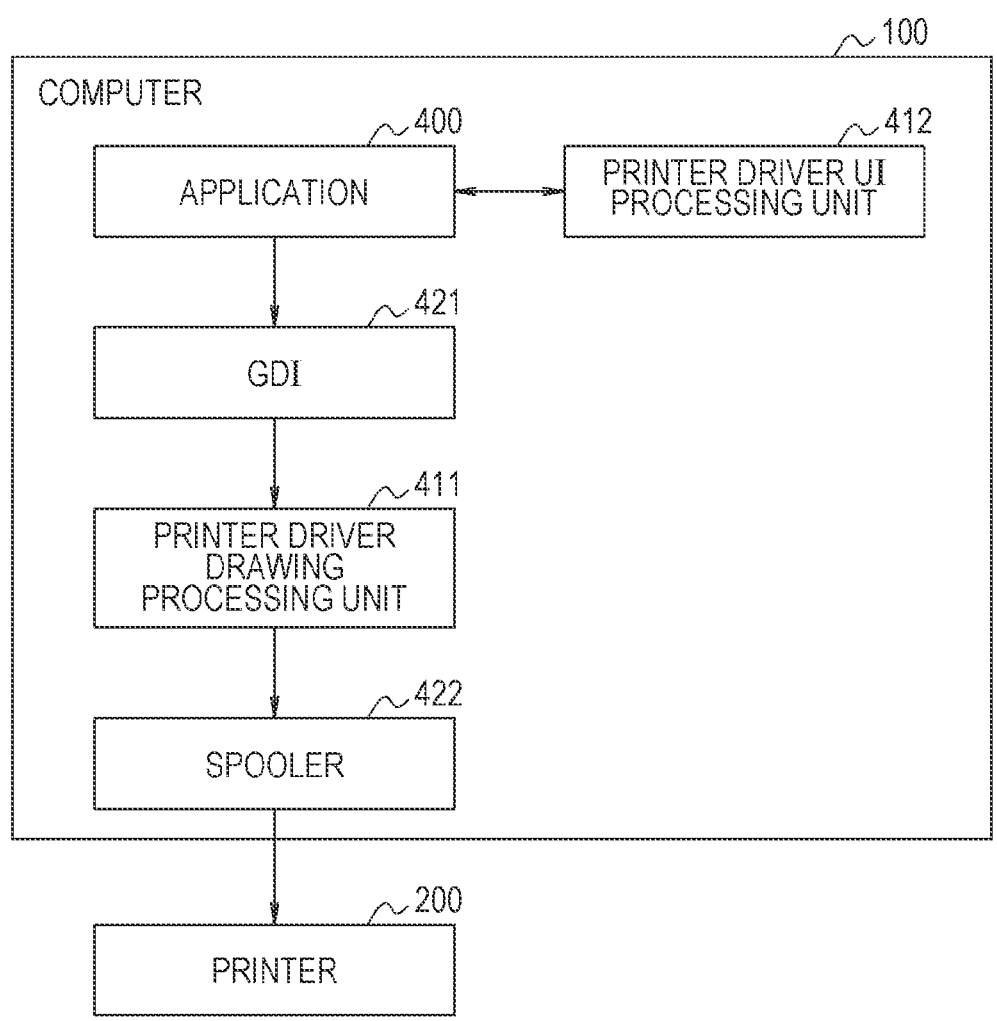
FIG. 5 is a conceptual diagram showing a flow of a printing process.

Next, a flow of a normal printing process executed by the printing system is described below with reference to FIG. 5. First, when the application 400 receives a printing instruction from a user, the application 400 performs a process of calling the UI processing unit 412 of the printer driver 410. In response to the call from the application 400, the UI processing unit 412 displays, on the display unit 110, a (for example, a printing setting UI 600 shown in FIG. 6A) for inputting a setting value of an arbitrary setting item related to printing, and accepts inputting via the printing setting UI 600. The UI processing unit 41 provides setting information input via the printing setting UI 600 to the application 400. The application 400 transmits a drawing instruction including print contents to the GDI 421 together with the selling information acquired from the UI processing unit 1220. The GDI 421 provides the acquired selling information and the drawing instruction, converted into a format that can be interpreted by the printer driver 410, to the drawing processing unit 411 of the printer driver 410. The drawing processing unit 411 converts the setting information and the drawing instruction acquired from the GDI 421 into the PDL interpretable by the printer 200 and provides them to the spooler 422. The spooler 422 transmits the received PDL to the printer 200 via the network communication unit 150 or the USB communication unit 160. The printer 200 prints the image data obtained from the acquired PDL on actual physical paper using the printing unit 270.

Figure 6A:
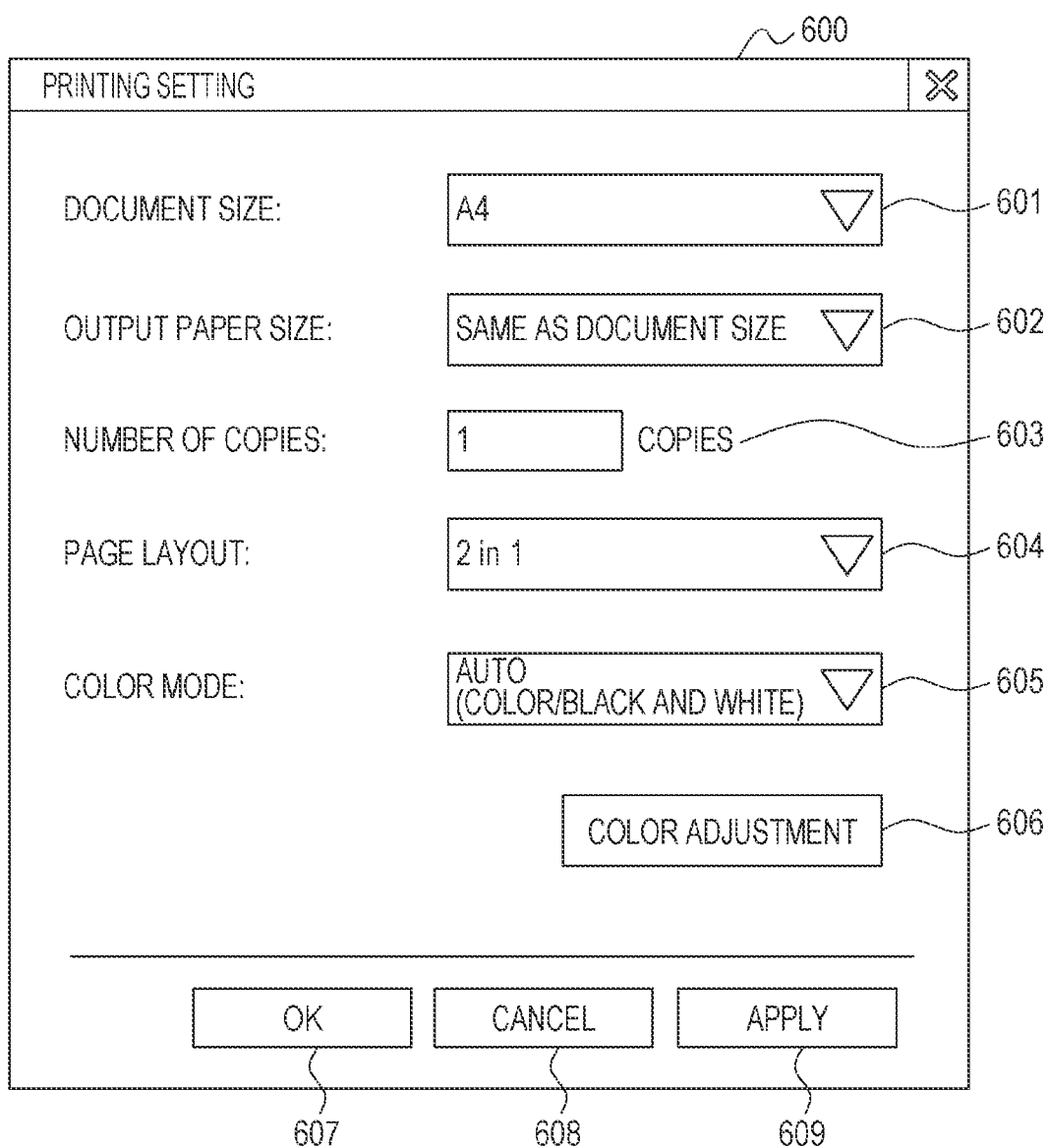
FIGS. 6A and 6B are diagrams each showing an example of a printer driver UI.

FIG. 6A is a diagram showing an example of the printing setting UI 600 displayed on the display unit 110 by the UI processing unit 412. The UI processing unit 412 of the printer driver 410 includes the printing setting UI 600. The UI processing unit 412 sets values of respective setting items displayed on the printing setting UI 600 and enables/disables these setting items according to input text information and operations on spin buttons using the operation unit 120. In response to the call from the application 400 as described above with reference to FIG. 5, the UI processing unit 412 displays the printing setting UI 600. The UI processing unit 412 may display the printing setting UI 600 in response to a call from a setting screen of the OS 420. In a case where the UI processing unit 412 is called from the application 400, information set via the printing setting UI 600 is temporarily used in printing by the application. On the other hand, in a case where the UI processing unit 412 is called from the setting screen of OS 420, information set via the printing setting UI 600 is saved as default values commonly used in printing by all applications 400.

Each setting item of the printing setting UI 600 is described below. A document size 601 is a setting item related to a paper size on which document data is to be printed. This document size 601 specifies a paper size employed in printing by the application 400. An output paper size 602 is a setting item related to a paper size of output paper that is actually used. The output paper size 602 is usually set to "same as the document size". When a specific paper size other than the "same as the document size" is set, the printer driver 410 or the printer 200 performs scaling according to the size ratio between the document size and the paper size and performs printing according to the resultant scaled size. The number of copies 603 is a setting item related to the number of copies. A page layout 604 is a setting item related to the number of document pages to be printed on one physical sheet. In the page layout 604, normally "1 in 1" is set. However, when "N in 1" (N is a default integer value) is set, N pages of the document are aggregated and reduced and resultant N pages are printed on one physical sheet. FIG. 6A shows an example in which "2 in 1" is set in the page layout 604.

Figure 6B:
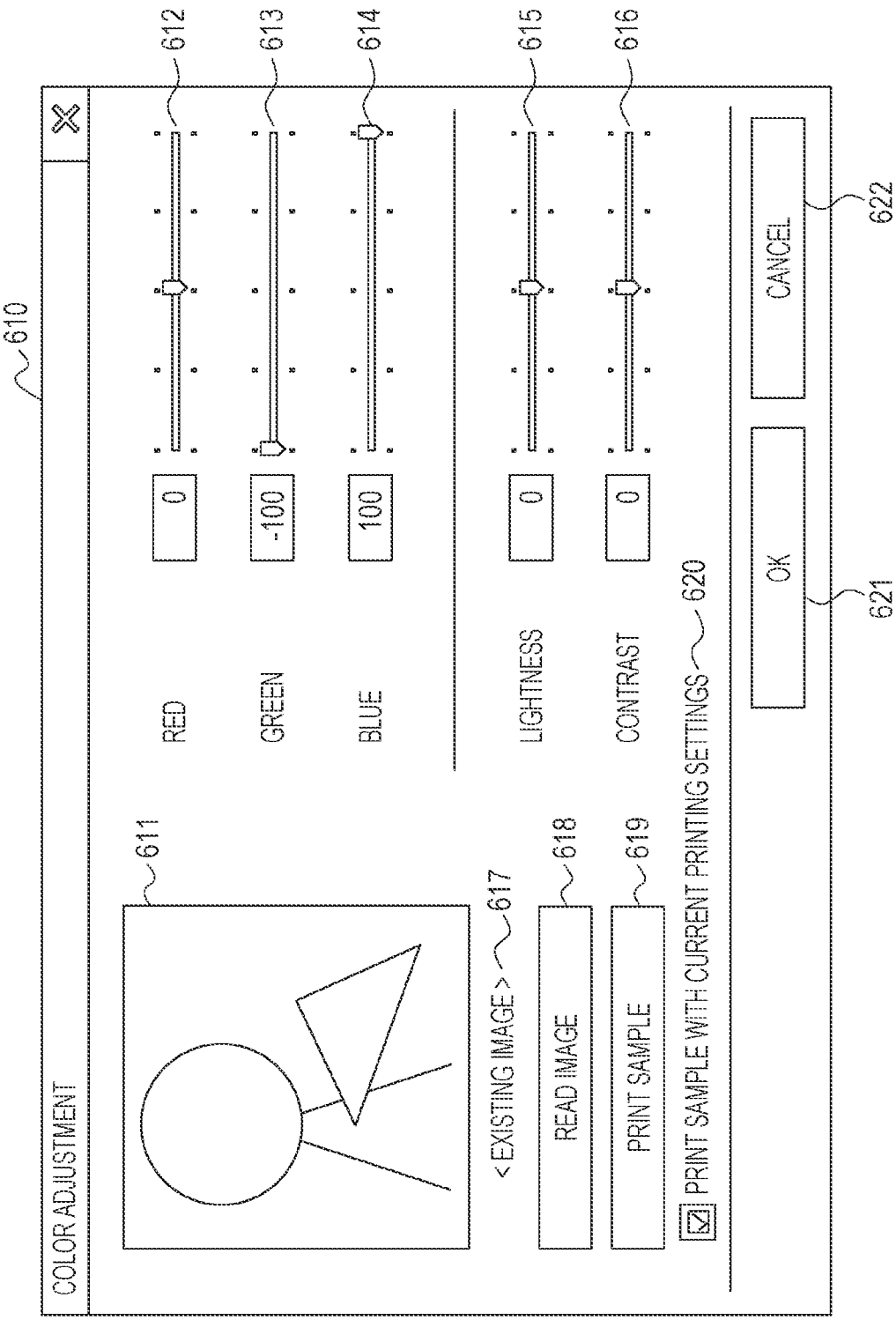

A color mode 605 is a setting item mainly used when color data is printed in a black-and-white color. A color adjustment button 606 is a button for instructing a color tone adjustment of an image. When the color adjustment button 606 is pressed, the UI processing unit 412 displays a color adjustment UI 610 (FIG. 6B). Details thereof will be described later. When an OK button 607 is pressed, the printer driver 410 saves setting values of currently set setting items in the memory 142 or the storage unit 130, and closes the printing setting UI 600. When a cancel button 608 is pressed, the printer driver 410 returns the setting values of the respective setting items to the original values and closes the printing setting UI 600. When an apply button 609 is pressed, the printer driver 410 saves the setting values of the currently set setting items in the memory 142 or the storage unit 130 without closing the printing setting UI 600.

Next, referring to FIG. 6B, the color adjustment UI 610 is described which is displayed on the display unit 110 by the UI processing unit 412 when the color adjustment button 606 of the printing setting UI 600 is pressed. The UI processing unit 412 of the printer driver 410 has the color adjustment UI 610. The color adjustment UI 610 is mainly used for the purpose of adjusting the color tone of a graphics image or a text image such that when the color tone is different from an expected color tone, the color tone is adjusted to the expected color tone. The color adjustment UI 610 displays setting items related to colors of an image (hereinafter, referred to as color adjustment parameters).

In the present embodiment, red (R) 612, green (G) 613, blue (B) 614, lightness 615, and contrast 616 are displayed as color adjustment parameters. A slide bar related to each of the color adjustment parameters is displayed. By moving this slide bar in a left-right direction on the operation unit 120, it is possible to change a setting value within an arbitrary numerical range (in the present example, from −100 to +100) centered at a standard value (in the present example, 0). The UI processing unit 412 is capable of adjusting the setting value of the color adjustment parameter according to the operation of the slide bar, By operating slide bars, a user is allowed to adjust the color adjustment parameters so as to obtain an expected color tone. A color adjustment preview 611 displays an image reflecting the current setting values of the color adjustment parameters. In the present embodiment, three primary colors of R, G, and B, lightness and contrast are used by way of example as the color adjustment parameters. However, the color adjustment parameters are not limited to these, and other parameters related to image quality may be used. Note that the set values of the color adjustment parameters may be adjusted with parts other than slide bars.

When a READ IMAGE button 618 of the color adjustment UI 610 is pressed, a dialog (not shown) for specifying an image file to be read is displayed. When an image file such as a png or jpeg image file is specified in the displayed dialog, the printer driver 410 reads the image file from the storage unit 130 or the like. The printer driver 410 displays the read image file in the color adjustment preview 611, and displays a file name of the image file in a text control 617. In the present embodiment, it is assumed by way of example that the acquired image file is in the png or jpeg format, but any image file may be used.

When a PRINT SAMPLE button 619 of the color adjustment UI 610 is pressed, the printer driver 410 prints the image displayed in the color adjustment preview 611 such that the current values of the color adjustment parameters are reflected on the printed image. Details thereof will be described later.

A check box 620 of the color adjustment UI 610 is used to switch the printing setting used in the sample printing. The printer driver 410 selects whether to perform printing according to the current printing settings or according to the printing settings for the sample printing depending on whether the check box 620 is enabled or disabled. The printing setting for sample printing is stored in advance in the storage unit 130 or the like.

When an OK button 621 is pressed, the printer driver 410 saves the current setting values of the color adjustment parameters in the memory 142 or the storage unit 130, and closes the color adjustment UI 610. When a CANCEL button 622 is pressed, the printer driver 410 returns the setting values of the respective color adjustment parameters to the original values and closes the color adjustment UI 610.

Next, a sample printing process is described below with reference to FIGS. 7 to 11. The sample printing process is executed when the PRINT SAMPLE button 619 of the color adjustment UI 610 is pressed, such that a program of the printer driver 410 stored in the storage unit 130 is loaded into the memory 142 and executed by the CPU 141. Unless otherwise specified, the printer driver 410 is a main unit that executes the process shown in the flowcharts according to the present embodiment. In the following description, the step number of each step is denoted by a numeral indicating the step number with a prefix of S without using a description of "step".

Figure 7:
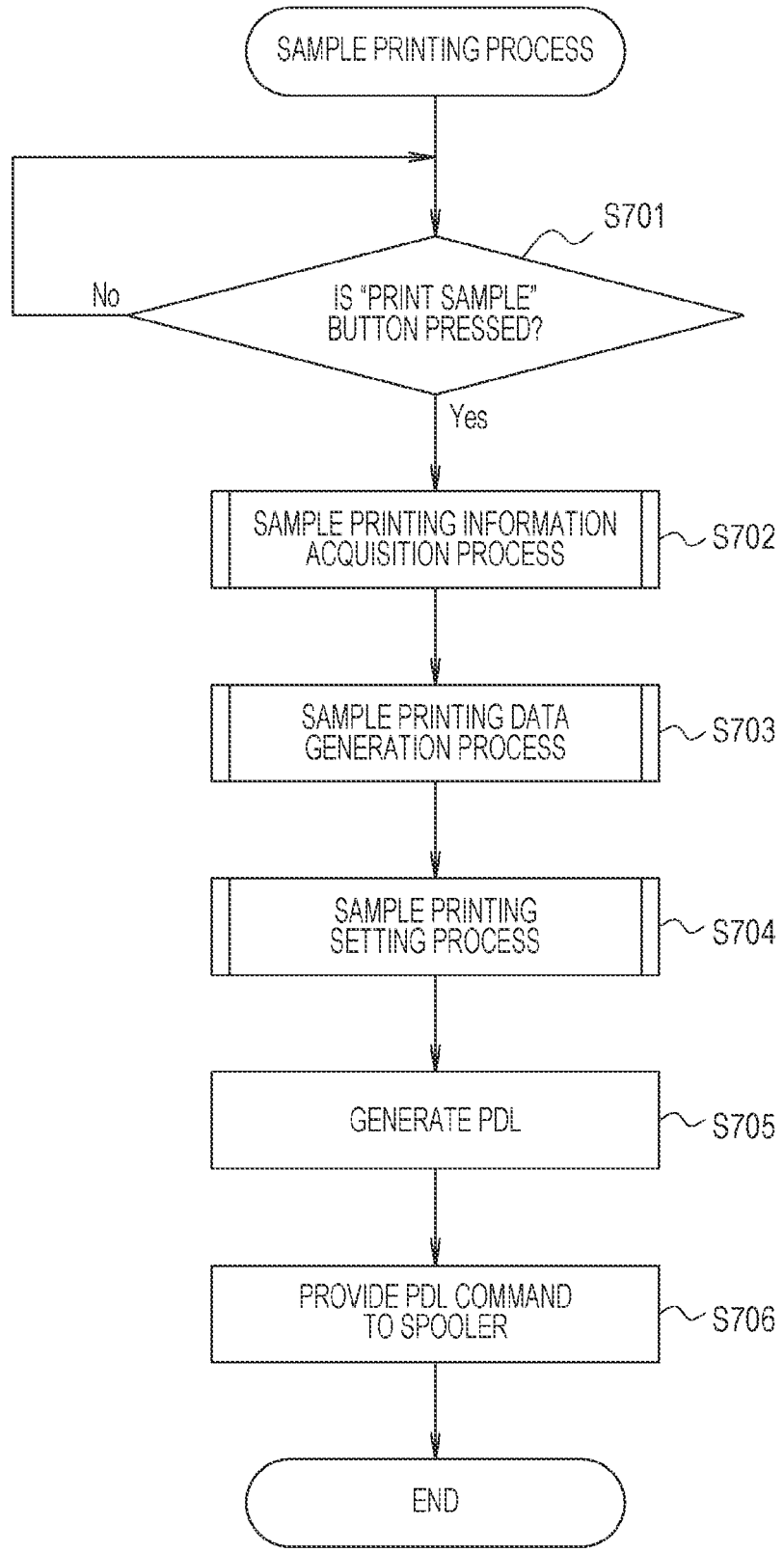
FIG. 7 is a flowchart showing a sample printing process.

FIG. 7 is a flowchart showing a sample printing process.

In S701, the printer driver 410 displays the color adjustment UI 610 on the display unit 110, and waits until the PRINT SAMPLE button 619 is pressed. If it is determined that the PRINT SAMPLE button 619 is pressed, the process proceeds to S702. The color adjustment UI 610 may be displayed via the printing setting UI 600 called from the application 400, or may be displayed via the printing setting UI 600 called from the setting screen of the OS 420.

In S702, the printer driver 410 acquires sample printing information. The sample printing information refers to information that is added to printing data of the sample to be printed. Details of S702 will be described later with reference to FIG. 8.

Next, in S703, the printer driver 410 generates sample printing data based on the sample printing information acquired in S702. The sample printing data refers to printing data of the sample to be printed. Details of S703 will be described later referring to FIG. 9.

Next, in S704, the printer driver 410 sets the printing setting for the sample printing based on the information currently set in the printing setting UI 600. Details of S704 will be described later with reference to FIG. 10.

Next, in S705, the printer driver 410 converts the sample printing data generated in S703 into drawing data (PDL)

interpretable by the printer 200. After that, in S706, the printer driver 410 transmits PDL commands generated in S705 to the spooler 422. Thus, the sample printing process is completed.

Next, the details of the process of acquiring the sample printing information (in S702 in FIG. 7) are described with reference to FIG. 8. Unless otherwise specified, the printer driver 410 is a main unit that executes the process shown in the flowchart in FIG. 8.

In S801, the printer driver 410 acquires the setting values of the color adjustment parameters from the information currently set in the color adjustment UI 610. In the present embodiment, the color adjustment parameters include the three primary colors of R, G, and B (612, 613, 614), the lightness (615), and the contrast (616) set via the color adjustment UI 610, but the parameters are not limited to these, and other parameters related to the image quality may be used.

Next, in S802, the printer driver 410 determines whether or not an arbitrary image is specified as the target image for the sample printing. In the present embodiment, when an image is specified by the READ IMAGE button 618 of the color adjustment UI 610, it is determined that an arbitrary image is specified. In a case where it is determined that the arbitrary image is specified, the process proceeds to S803.

In S803, the printer driver 410 acquires the image data of the image file read in response to pressing the READ IMAGE button 618 from the storage unit 130 or the like. Thereafter, in S804, the printer driver 410 acquires a file name of the read image file.

On the other hand, in a case where it is determined in S802 that an arbitrary image is not specified, the process proceeds to S805 in which the printer driver 410 acquires image data stored in advance for sample printing from the storage unit 130 or the like.

Next, in S806, the printer driver 410 attempts to acquire information related to the printer 200 to which printing data is to be output (hereinafter, the information related to the printer 200 is referred to as printer information). One of methods of acquiring the printer information is to transmit a request such as Get Printer API to the printer 200 via the network communication unit 150 or the USB communication unit 160, and acquire the printer information transmitted in response to the request from the printer 200. The printer information includes a device name, a driver name, and the like of the primer 200. The method for acquiring the printer information is not limited to the above-described method, and other methods may be used as long as the printer information can be acquired. Furthermore, the items of the printer information are not limited to the device name and the driver name of the printer 200, but the printer information may include other items that can identify the output destination printer 200, such as an IP address of the printer 200.

If the acquisition of the printer information in S806 is successful, the process proceeds to S807 in which the printer driver 410 acquires the printer information. After that, the process returns to the flowchart in FIG. 7. On the other hand, in a case where the acquisition of the printer information in S806 fails, the process directly returns to the flowchart of FIG. 7.

Figure 8:
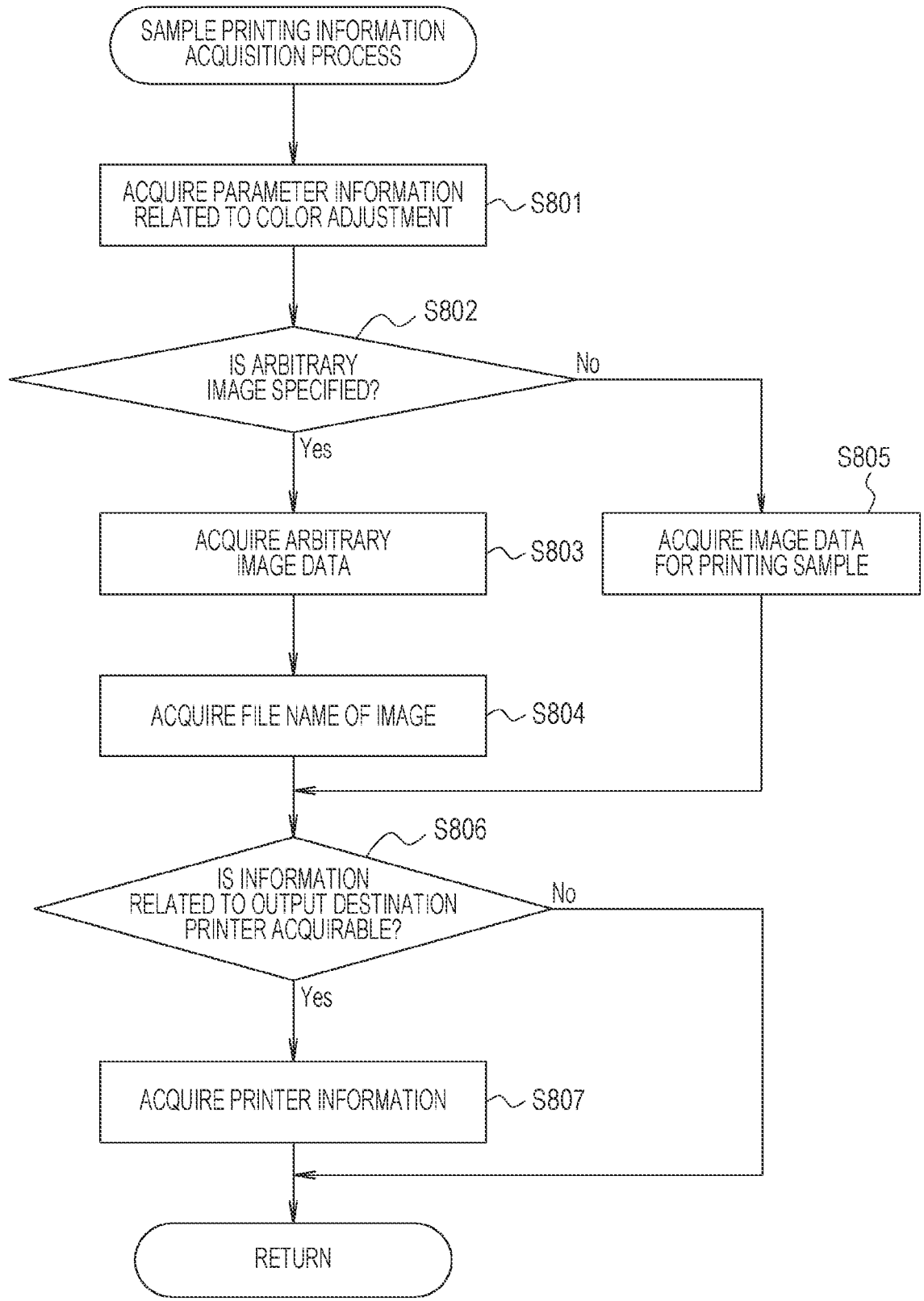
FIG. 8 is a flowchart showing a process of acquiring sample printing information.

According to the process described above with reference to the flowchart shown in FIG. 8, the printer driver 410 acquires the parameter setting information related to the image quality, the information on the output destination printer, and the like, and thus it is possible to provide output information including the above-described information when the color adjustment is performed. Furthermore, since it is allowed to specify an arbitrary image, it is also possible to perform the color adjustment using an image depending on a preference of a user.

Next, the details of the process of generating the sample printing data (in S703 in FIG. 7) is described with reference to FIG. 9. Unless otherwise specified, the printer driver 410 is a main unit that executes the process shown in the flowchart in FIG. 9.

In S901, the printer driver 410 generates image data drawn on a page based on the image data acquired in S803 or S805 in FIG. 8. In the present embodiment, when an arbitrary image is specified and the specified arbitrary image is printed such that an effective printing area is fully used while maintaining the aspect ratio of the image, there is a possibility that a margin area occurs. In view of this, the printer driver 410 determines in S902 whether or not the sample printing information acquired in S801, S804, and S807 in FIG. 8 can be entirely printed within the margin area of the image data generated in S901. The sample printing information refers to information including setting values of color adjustment parameters, a file name of the arbitrary image, and printer information. In the present embodiment, it is determined whether or not all the color adjustment parameters that can be adjusted by the color adjustment UI 610 can be entirely printed within the margin area. However, alternatively, the determination may be made as to whether or not, instead of all color adjustment parameters, only a color adjustment parameter changed from a standard value can be printed in the margin area. Examples of color adjustment parameters changed from the standard values are green 613 and blue 614 in FIG. 6B.

Figure 11A:
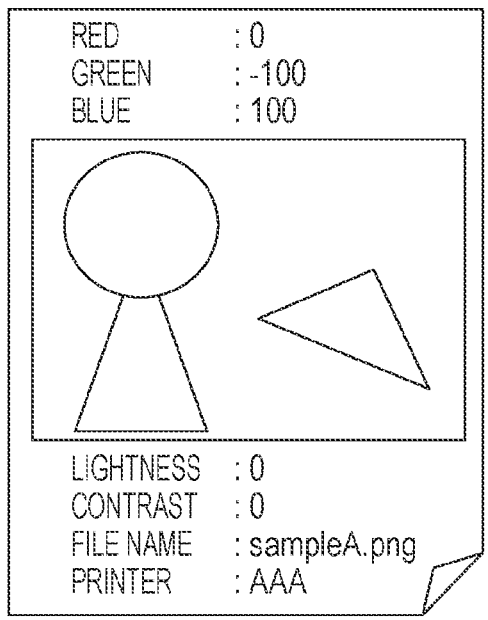
FIGS. 11A to 11C are diagrams showing examples of sample printing data.
Figure 11B:
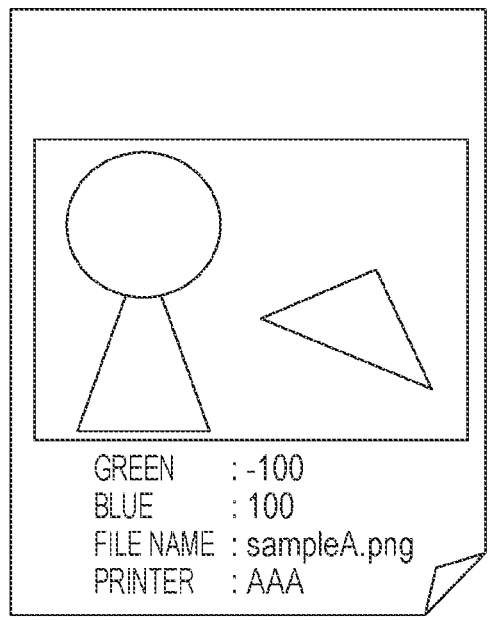
Figure 11C:
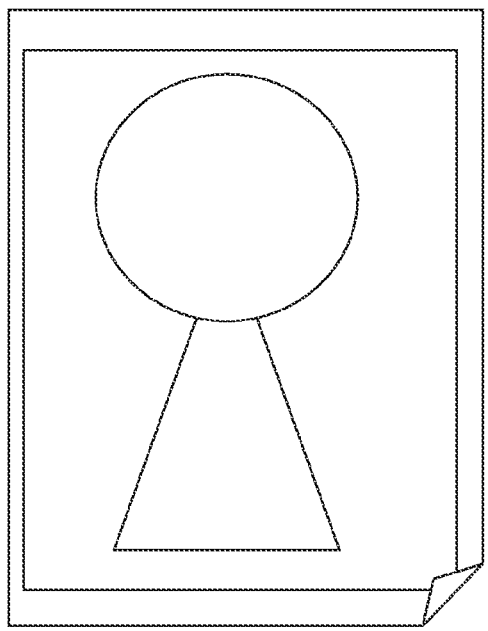

In a case where it is determined in S902 that the sample printing information can be entirely printed in the margin area, the process proceeds to S903. In S903, the printer driver 410 generates printing data (sample printing data) in which the sample printing information is placed in the margin area of the image data generated in S901. FIGS. 11A to 11C are diagrams illustrating examples of sample printing data according to the present embodiment. FIG. 11A shows an example in which setting values of all color adjustment parameters, the file name of the arbitrary image, and the printer information are placed in the margin area of the arbitrary image. FIG. 11B shows an example in which setting values of color adjustment: parameters changed from their standard values, the file name of the arbitrary image, and the printer information are placed in the margin area of the arbitrary image. As in this example, the printer driver 410 may generate the sample printing data including only part of color adjustment parameters of all color adjustment parameters adjustable on the color adjustment UI 610. More specifically, for example, the printer driver 410 may generate the sample printing data such that color adjustment parameters changed from their standard values are included in the sample printing data, but color adjustment parameters equal to their standard values are not included in the sample printing data. For example, the printer driver 410 may generate the sample printing data such that color adjustment parameters having a high relevance to the image quality are included in the sample printing data but color adjustment parameters having a low relevance to the image quality are no included in the sample printing data.

On the other hand, in a case where it is determined in S902 that the sample printing information cannot be entirely printed in the margin area, the process proceeds to S904. In S904, the printer driver 410 generates printing data (sample printing data) in which the sample printing information is placed on a page next to a page of the image data generated in S901. FIG. 11C shows an example in which an arbitrary image is placed on a first page, and setting values of all color adjustment parameters, the file name of the arbitrary image data, and the printer information are placed on a second page.

Next, in S905, the primer driver 410 performs color conversion on the sample printing data generated in S903 or S904 according to the setting values of the color adjustment parameters acquired in S801. After that, the process returns to the flowchart in FIG. 7.

Figure 9:
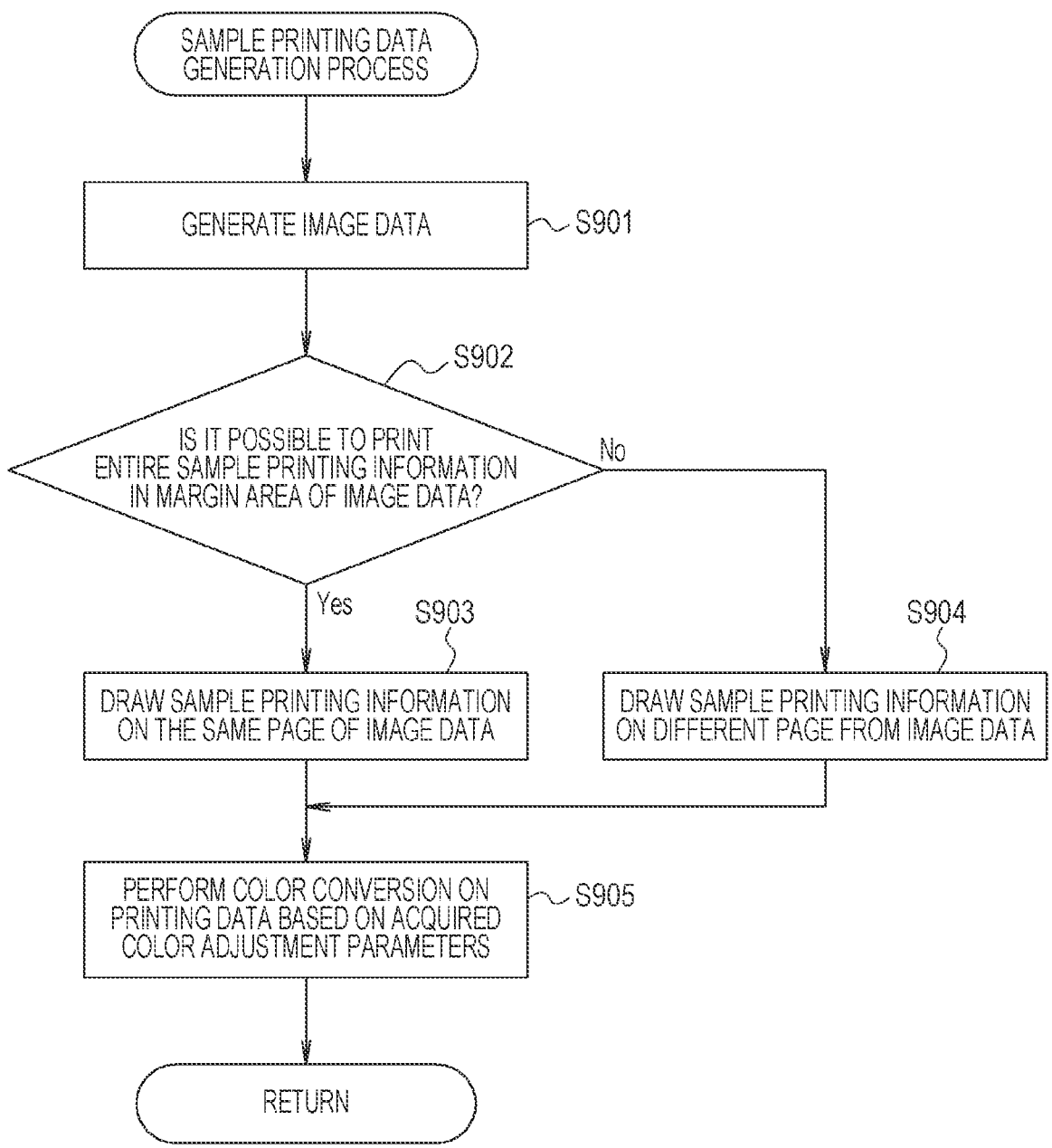
FIG. 9 is a flowchart showing a process of generating sample printing data.

According to the process of the flowchart shown in FIG. 9, as described above, when the color adjustment is performed, the setting information as to the parameters related to the image quality used in the color conversion can be printed on the result of the image printed after being subjected to the color conversion.

Next, the details of the printing setting process for the sample printing setting (in S704 in FIG. 7) are described with reference to FIG. 10. Unless otherwise specified, the printer driver 410 is a main unit that executes the process shown in the flowchart in FIG. 10.

In S1001, the printer driver 410 determines whether or not the option of "PRINT SAMPLE WITH CURRENT PRINTING SETTINGS" is enabled. In the present embodiment, when it is determined that a check box 620 of the color adjustment UI 610 is checked, it is determined that the option of "PRINT SAMPLE WITH CURRENT PRINTING SETTINGS" is enabled, and the process proceeds to S1002, in S1002, the printer driver 410 acquires the setting information from the information currently set in the printing setting UI 600. In this example, information indicating that the document size is A4, the page layout is 2in1, etc., is acquired as the setting information. After that, the process proceeds to S1004.

On the other hand, in a case where it is determined in S1001 that the check box 620 of the color adjustment UI 610 is not checked, it is determined that the operation of "PRINT SAMPLE WITH CURRENT PRINTING SETTINGS" is disabled, and the process proceeds to S1003. In S1003, the printer driver 410 acquires printing settings for the sample printing from the storage unit 130 or the like. The printing settings for the sample printing may specify, for example, that the document size is A4, the page layout is 1in1, etc. After that, the process proceeds to S1004. As described above with reference to S1001 to S1003, the printer driver 410 determines which printing setting is to be used in printing the sample printing data.

In S1004, the printer driver 410 determines whether or not the sample printing data generated in S703 in FIG. 7 includes a plurality of pages. In a case where the printer driver 410 determines that the sample printing data does not include a plurality of pages, the process directly returns to the flowchart of FIG. 7. On the other hand, in a case where the printer driver 410 determines that the sample printing data includes a plurality of pages, the process proceeds to S1005.

In S1005, the printer driver 410 enables setting items of a duplicate printing mode. After that, the process returns to the flowchart in FIG. 7. For example, in a case where image data is placed on a first page and parameter information is placed on a second page as shown in FIG. 11C, the printer driver 410 determines that the sample printing data includes a plurality of pages and enables the duplicate printing mode. As a result, in printing, the sample printing information is printed on a back side of paper. The printer driver 410 may enable the duplicate printing mode only when 1in1 is specified in the page layout.

Figure 10:
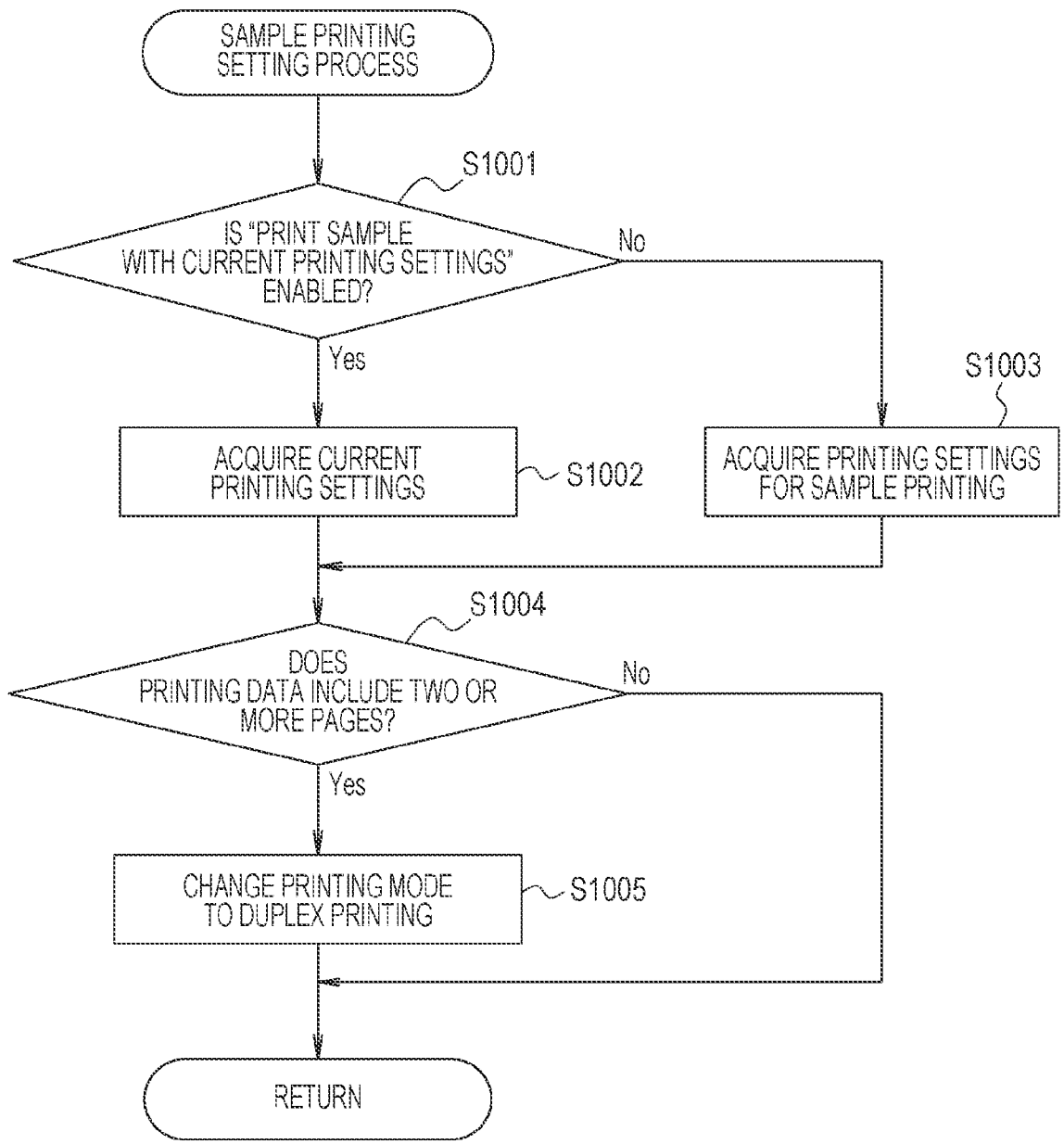
FIG. 10 is a flowchart showing a process of performing printing settings for sample printing.

According to the process of the flowchart shown in FIG. 10, as described above, a user is allowed to select whether the sample is printed with the current printing settings or with the printing settings tor the sample printing. Thus, it is possible to provide output information according to an intention of the user.

According to the present embodiment, as described above, the computer 100 is capable of operating such that in the color adjustment process, when an image subjected to a color conversion is printed, parameter setting information related to image quality, information indicating an output destination printer, and the like are printed together with the resultant image. This makes it possible for the user to quickly grasp conditions under which the image is printed. That is, the user can understand the contents of the setting performed for the sample printing even after the printing is performed, which provides improved convenience for the user.

Although the present disclosure has been described above with reference to the embodiments, these embodiments are merely examples, and the technical scope of the present disclosure is not limited by these embodiments. That is, embodiments of the present disclosure can be implemented in various forms without departing from the technical idea or its main features.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-179602, filed Oct. 27, 2020, which is hereby incorporated by reference herein in its entirety.

What is claimed is:

1. An information processing apparatus comprising:
one or more processors; and
at least one computer-readable medium storing executable instructions configured to be executed by the one or more processors, wherein the at least one computer-readable medium and the one or more processors are configured to:
cause a display unit to display a first printing setting user interface (UI) including a plurality of printing setting values corresponding to a plurality of printing setting items, the plurality of printing setting items including a page layout; and
cause the display unit to display a second printing setting UI;
the second printing setting UI including
an area for setting contrast,
a sample image displayed with the set contrast, and
an object for printing the sample image with the set contrast,
wherein in causing a printing unit to print the sample image in response to a selection of the object, a certain printing setting value corresponding to the page layout of the plurality of printing setting values set in the first printing setting UI is not used, and another printing setting value for the sample image is used instead of the certain printing setting value corresponding to the page layout.

2. The information processing apparatus according to claim 1, wherein the first printing setting UI is a UI for allowing a user to determine a printing setting value used in printing a document.

3. The information processing apparatus according to claim 2, wherein in causing the printing unit to print the document, all the set plurality of printing setting values are used.

4. The information processing apparatus according to claim 1, wherein the printing unit is a printer.

5. The information processing apparatus according to claim 1, wherein in causing the printing unit to print the sample image, information on at least one printing setting value of the set plurality of printing setting values is printed together with the sample image.

6. The information processing apparatus according to claim 1, wherein the second printing setting UI receives, from a user, an instruction to set another image as a sample image instead of a current sample image.

7. An information processing method, comprising:
causing a display unit to display a first printing setting user interface (UI) including a plurality of printing setting values corresponding to a plurality of printing setting items, the plurality of printing setting items including a page layout; and
causing the display unit to display a second printing setting UI;
the second printing setting UI including
an area for setting contrast,
a sample image displayed with the set contrast, and
an object for printing the sample image with the set contrast,
wherein in causing a printing unit to print the sample image in response to a selection of the object, a certain setting value corresponding to the page layout of the plurality of printing setting values set in the first printing setting UI is not used, and another printing setting value for the sample image is used instead of the certain setting value corresponding to the page layout.

8. The information processing method according to claim 7, wherein the first printing setting UI is a UI for allowing a user to determine a printing setting value used in printing a document.

9. The information processing method according to claim 8, wherein in causing the printing unit to print the document, all the set plurality of printing setting values are used.

10. The information processing method according to claim 7, wherein the printing unit is a printer.

11. The information processing method according to claim 7, wherein in causing the printing unit to print the sample image, information on at least one printing setting value of the set plurality of printing setting values is printed together with the sample image.

12. The information processing method according to claim 7, wherein the second printing setting UI receives, from a user, an instruction to set another image as a sample image instead of a current sample image.

13. A non-transitory computer-readable storage medium storing a computer program for causing an information processing apparatus to perform an information processing method, the information processing method comprising:
causing a display unit to display a first printing setting user interface (UI) including a plurality of printing setting values corresponding to a plurality of printing setting items, the plurality of printing setting items including a page layout; and
causing the display unit to display a second printing setting UI;
the second printing setting UI including
an area for setting contrast,
a sample image displayed with the set contrast, and
an object for printing the sample image with the set contrast,
wherein in causing a printing unit to print the sample image in response to a selection of the object, a certain setting value corresponding to the page layout of the plurality of printing setting values set in the first printing setting UI is not used, and another printing setting value for the sample image is used instead of the certain setting value corresponding to the page layout.

14. The non-transitory computer-readable storage medium according to claim 13, wherein the first printing setting UI is a UI for allowing a user to determine a printing setting value used in printing a document.

15. The non-transitory computer-readable storage medium according to claim 14, wherein in causing the printing unit to print the document, all the set plurality of printing setting values are used.

16. The non-transitory computer-readable storage medium according to claim 13, wherein the printing unit is a printer.

17. The non-transitory computer-readable storage medium according to claim 13, wherein in causing the printing unit to print the sample image, information on at least one printing setting value of the set plurality of printing setting values is printed together with the sample image.

18. The non-transitory computer-readable storage medium according to claim 13, wherein the second printing setting UI receives, from a user, an instruction to set another image as a sample image instead of a current sample image.

* * * * *